United States Patent [19]

Peterson

[11] Patent Number: 4,482,523

[45] Date of Patent: Nov. 13, 1984

[54] AMMONIA SYNTHESIS CONVERTER

[75] Inventor: Robert B. Peterson, Houston, Tex.

[73] Assignee: The M. W. Kellogg Company, Houston, Tex.

[21] Appl. No.: 550,858

[22] Filed: Nov. 14, 1983

[51] Int. Cl.³ ............................................. B01J 8/04
[52] U.S. Cl. ................................. 422/148; 422/191; 422/195; 422/203
[58] Field of Search ............... 422/148, 191, 195, 198, 422/203

[56] References Cited

U.S. PATENT DOCUMENTS

| | | | |
|---|---|---|---|
| 2,512,586 | 6/1950 | Stengel | 23/288 |
| 2,887,365 | 5/1959 | De Rycker et al. | 422/148 |
| 3,031,274 | 4/1962 | Schober | 23/289 |
| 3,366,461 | 1/1968 | Christensen | 23/289 |
| 3,420,630 | 1/1969 | Braun | 23/198 |
| 3,475,136 | 10/1969 | Eschenbrenner et el. | 23/289 |
| 3,622,266 | 11/1971 | Laukel | 23/1 E |
| 4,180,543 | 12/1979 | Ward | 422/148 |
| 4,230,669 | 10/1980 | Eagle et al. | 422/191 |
| 4,311,671 | 1/1982 | Notman | 422/148 |
| 4,372,920 | 2/1983 | Zardi | 422/148 |

Primary Examiner—Richard V. Fisher
Assistant Examiner—W. Gary Jones

[57] ABSTRACT

A vertical, cold wall, three bed ammonia converter wherein the first catalyst bed is in series flow with the second and third beds which are in parallel flow, the converter having an internal indirect heat exchanger for cooling effluent from the first catalyst bed.

7 Claims, 2 Drawing Figures

AMMONIA SYNTHESIS CONVERTER

This invention relates to vertical converters for exothermic, catalytic synthesis of ammonia from hydrogen and nitrogen. The synthesis is well known and is typically conducted at pressures within the range from about 70 to about 325 bars and temperatures within the range from about 340° C. to about 525° C.

A single converter is generally employed in modern, large capacity ammonia plants. In a 1000 metric ton per day plant, the catalyst volume will range from about 40 to 90 $m^3$ and be contained in a converter having a diameter from about 2 to about 4 m and length or height from about 10 to 35 m. Catalyst beds within the converter may be arranged for transverse flow, radial flow, or axial flow of gas. Axial flow converters are quite common and usually employ a cold wall, double shell design which provides a shell annulus for passage of cooling gas adjacent the outside pressure shell. The converter of the present invention is a cold wall, axial flow converter.

It is not feasible to contain the entire catalyst volume in a single catalyst bed because of reaction equilibrium considerations and the possibility of catalyst overheating and damage. It has, therefore, been common practice to arrange the catalyst in multiple beds with provision for interbed or intrabed cooling. Customarily, this cooling is provided by interbed injection of cool synthesis gas for direct heat exchange with partially converted gas (i.e. - a direct quench converter or some combination of direct gas quench with interbed heat exchangers of the shell and tube type). Converter designs which emphasize direct quench tend to be less costly than combination designs since fewer, smaller, shell and tube exchangers are employed according to the volume of quench gas introduced. Plants employing these designs do, however, suffer the penalty of higher synthesis gas compression costs since the totality of synthesis gas to the converter does not contact the totality of the catalyst therein. Therefore, more gas must be circulated to obtain a given amount of ammonia product.

From the foregoing, it may be appreciated that ammonia converters are large, complex items of equipment and that steps toward more efficient, less costly design are needed.

According to the invention a vertical, cold wall, three bed converter having a single heat exchanger is provided. The three axial flow catalyst beds are arranged vertically within the cylindrical inner shell of the converter. Gas flows in series through the shell annulus, the cold exchange side of the indirect heat exchanger, the upper catalyst bed, the hot exchange side of the indirect heat exchanger and, finally, in parallel through the intermediate and lower catalyst beds. Outlet gas from the intermediate and lower beds is preferably recombined for common discharge through a single gas outlet means.

The converter of the invention employs no external quench gas between or within the catalyst beds. That is to say, it is a full flow converter in which the outlet portion of the hot exchange side of the indirect heat exchanger is in exclusive flow communication with respective inlet portions of the intermediate and lower catalyst beds. Accordingly, all of the converter outlet gas from the intermediate and lower catalyst beds passes initially through the upper catalyst bed.

The catalyst beds are laterally defined by respective portions of the cylindrical inner shell and are supported by foraminous partitions which, in turn, are supported by the inner shell. An intermediate fluid barrier means or partition is disposed between the upper and intermediate catalyst beds to prevent direct gas flow therebetween. Similarly, a lower fluid barrier means or partition is disposed between the intermediate and lower catalyst beds to prevent direct gas flow therebetween. Axial conduits or other flow communication means are disposed in the catalyst beds to route gas in accordance with the process gas flow described above.

In one embodiment of the invention, the single indirect heat exchanger is located adjacently above the upper catalyst bed. In another embodiment of the invention, the single heat exchanger is located adjacently below the upper catalyst bed.

Since reactant synthesis gas entering the upper catalyst bed is hydrogen and nitrogen with only small amounts of other gases, the synthesis reaction is relatively fast and conversion must be limited to avoid catalyst damage from excessively high temperature. Partially converted gas from the upper bed is cooled in the indirect heat exchanger and the cooled, partially converted gas is introduced in parallel to the intermediate and lower beds. This cooled gas contains ammonia and lessened amount of hydrogen and nitrogen which results in relatively slower synthesis reaction in the downstream, parallel catalyst beds as well as a higher ammonia concentration equilibrium. Accordingly, the intermediate and lower catalyst beds have decreased vulnerability to overheating as conversion to ammonia increases and, therefore, may contain more catalyst than the upper bed. For most effective utilization of the converter of the invention, the intermediate and lower catalyst beds contain substantially equal volumes of catalyst and catalyst volume of the upper bed is from about 35 to about 65 percent of catalyst volume in either the intermediate or lower catalyst bed.

Figure 1:
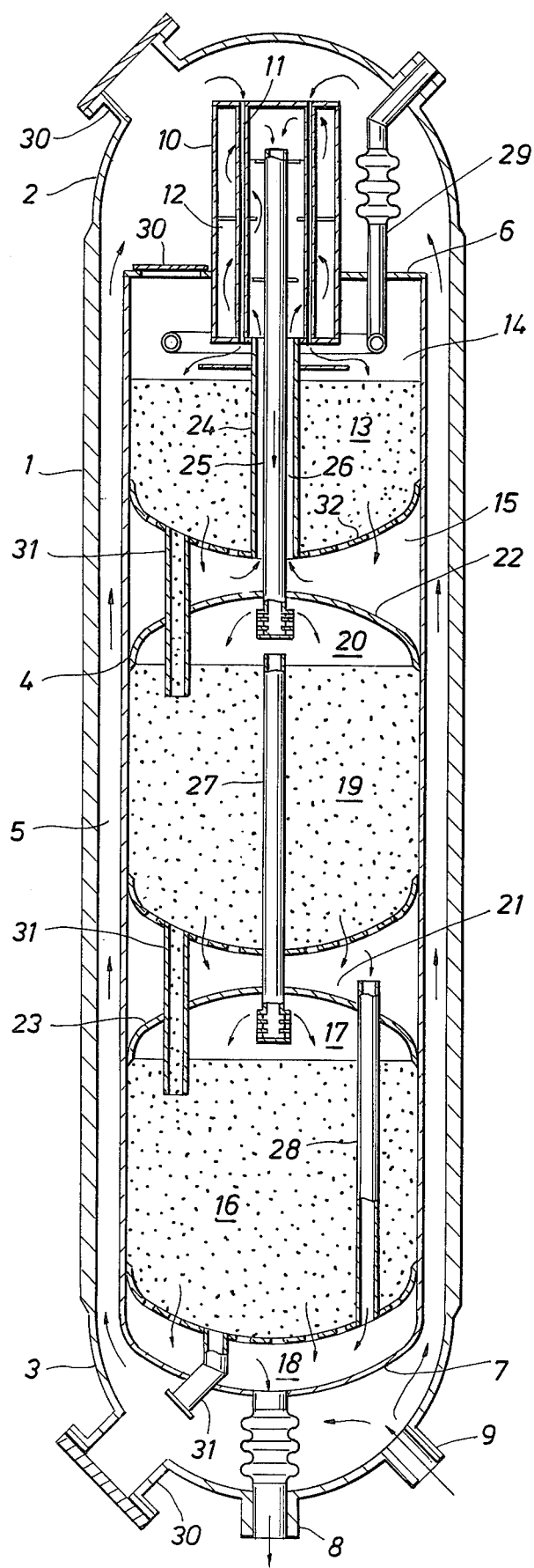
FIG. 1 is an embodiment of the invention wherein the heat exchanger is located above the upper catalyst bed.

Referring to FIG. 1, the vertical converter is contained within cylindrical pressure shell 1 which is attached to top outer head 2 and bottom outer head 3. A cylindrical inner shell 4 is disposed within and parallel to the pressure shell and is spaced therefrom to form shell annulus 5. Top inner head 6 and bottom inner head 7 are attached to the inner shell. Gas outlet means 8 disposed in bottom outer head 3 and bottom inner head 7 provides fluid communication between the internal portion of the bottom inner head and external piping for conversion product gas and also provides a fluid barrier between conversion product gas and reactant synthesis gas introduced to the shell annulus through gas inlet means 9 which is also disposed in the bottom outer head.

A shell and tube heat exchanger 10 is mounted in the top inner head 6. In this embodiment, the exchanger tube side 11 is the cold heat exchange side for reactant synthesis gas incoming from the shell annulus and the exchanger shell side 12 is the hot heat exchange side for partially converted gas. The exchanger shell is contiguous with the top inner head to effect a fluid barrier between the shell annulus and the inside of inner shell 4.

Upper catalyst bed 13 is located adjacently below the single heat exchanger and is contained and defined in part by the upper end of the cylindrical inner shell and supported by foraminous dished head 32 which is contiguous with the inner shell. The upper bed has an inlet portion 14 formed in part by the top surface of the catalyst bed and an outlet portion 15 below and adjacent to foraminous dished head 32.

Lower catalyst bed 16 having inlet portion 17 and outlet portion 18 as well as intermediate bed 19 having inlet portion 20 and outlet portion 21 are arranged similarly to the upper catalyst bed. The lower and intermediate catalyst bed volumes are substantially equal and the upper catalyst bed volume is from about 35 to about 65 percent of the intermediate bed volume.

Intermediate partition 22 is a dished head contiguous with cylindrical inner shell 4 which separates and forms an intermediate fluid barrier between outlet portion 15 of the upper catalyst bed and inlet portion 20 of the intermediate catalyst bed. Similarly, lower partition 23 forms a lower fluid barrier between outlet portion 21 of the intermediate catalyst bed and inlet portion 17 of the lower catalyst bed.

Axial upper conduit 24 is disposed centrally within the upper catalyst bed and axial, inner, upper conduit 25 is disposed centrally within it to form conduit annulus 26. The conduit annulus provides fluid communication between outlet portion 15 of the upper catalyst bed and inlet end of the hot heat exchange side 12 of the indirect heat exchanger. The axial, inner, upper conduit 25 provides fluid communication between the outlet end of the hot heat exchange side 12 of the exchanger and inlet portion 20 of the intermediate catalyst bed.

Axial intermediate conduit 27 is disposed within the intermediate catalyst bed and provides fluid communication between the inlet portion 20 of the intermediate catalyst bed and inlet portion 17 of the lower catalyst bed. Axial lower conduit 28 is disposed within the lower catalyst bed and provides fluid communication between outlet portion 21 of the intermediate catalyst bed and outlet portion 18 of the lower catalyst bed.

The foregoing arrangement provides for flow of reactant synthesis gas into the converter via gas inlet 9, upwardly through shell annulus 5 to cool the pressure shell and into the cool exchange side 11 of the heat exchanger where the gas is heated to conversion temperature by indirect heat exchange with partially converted gas in the shell side. The heated reaction synthesis gas from the tubes 11 is preferably mixed with from about 1 to about 20 volume % of supplemental reaction synthesis gas introduced through injection means 29 for the purpose of precise temperature control. The reaction synthesis gas then flows axially downward through the upper catalyst bed 13, then upwardly via conduit annulus 26 and through hot exchange side 12 of the exchanger where at least a portion of exothermic reaction heat is removed from the now partially converted gas. The cooled, partially converted gas flows from the upper part of the exchanger shell side 12 downwardly through the axial, inner, upper conduit 25 to the inlet portion 20 of the intermediate catalyst bed where flow is divided substantially equally between the intermediate catalyst bed 19 and the lower catalyst bed 16 via the axial intermediate conduit 27. Conversion product gas from the intermediate catalyst bed flows via the axial lower conduit 28 to the outlet portion 18 of the lower catalyt bed where it mixes with corresponding conversion product gas from the lower catalyst bed for common discharge through gas outlet 8. Accordingly, all of the gas flowing in parallel through the intermediate and lower catalyst beds is initially passed through the upper catalyst bed. That is to say, no external quenching gas is employed in operation of the converter and interbed cooling of partially converted gas is supplied entirely by the single indirect heat exchanger.

In the converter, manways 30 are provided for inspection access and chutes 31 are provided for catalyst loading and unloading.

Figure 2:
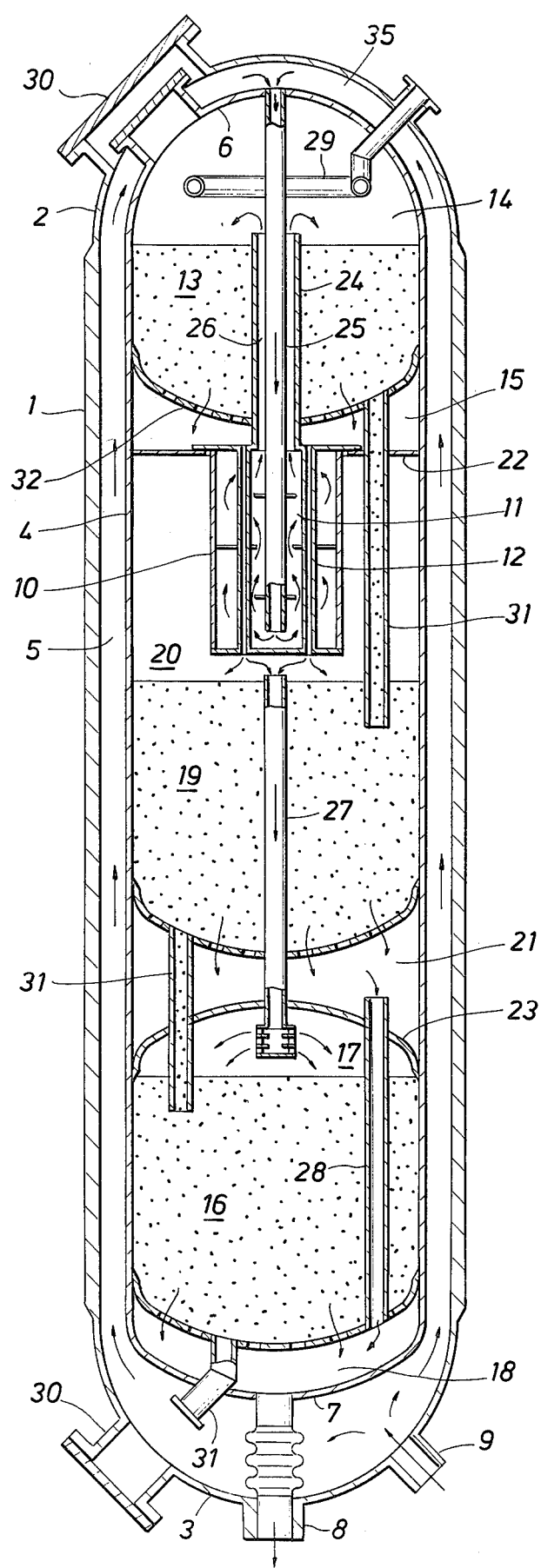
FIG. 2 is an embodiment of the invention wherein the heat exchanger is located below the upper catalyst bed.

Referring now to FIG. 2, the reference numerals have substantially the same identification and purpose as in FIG. 1. In FIG. 2, the single indirect heat exchanger 10 is located adjacently below the upper catalyst bed 13 and the cold exchange side 11 is now the shell side of the exchanger. Further, the inner, upper conduit is contiguous at its upper extremity with the top inner head 6 and provides fluid communication between the shell annulus 5 and the cold exchange side 11 via upper head annulus 35. The conduit annulus 26 provides fluid communication between the cold heat exchange side 11 and the inlet portion 14 of the upper catalyst bed.

I claim:

1. A vertical converter for exothermic reactions comprising:
   (a) a cylindrical pressure shell having top and bottom outer heads contiguous therewith;
   (b) a cylindrical inner shell disposed within substantially the entire length of the pressure shell and forming a shell annulus therewith, the inner shell having top and bottom inner heads contiguous with the inner shell;
   (c) gas outlet means;
   (d) gas inlet means in fluid communication with the shell annulus;
   (e) an indirect heat exchanger having cold and hot heat exchange sides disposed within the converter, the cold heat exchange side being in fluid communication with the gas inlet means;
   (f) three adiabatic catalyst beds arranged vertically within the converter, the three beds consisting of an upper catalyst bed, an intermediate catalyst bed, and a lower catalyst bed, each of the three beds being defined in part by the inner shell, and each of the three beds having respective inlet and outlet portions for axial gas flow through the catalyst beds wherein:
      (i) the upper catalyst bed is disposed adjacent the indirect heat exchanger, the inlet portion of the upper bed is in fluid communication with the cold heat exchange side, and the outlet portion of the upper bed is in fluid communication with the hot heat exchange side,
      (ii) the lower catalyst bed is disposed in the lower portion of the converter, the inlet portion of the lower bed is in fluid communication with the hot heat exchange side and the outlet portion of the lower bed is in fluid communication with the gas outlet means,
      (iii) the intermediate catalyst bed is disposed adjacently above the lower catalyst bed, the inlet portion of the intermediate bed is in fluid communication with the hot heat exchange side, and the outlet portion of the intermediate bed is in fluid communication with the gas outlet means, and
      (iv) all of the gas flow to the lower and intermediate catalyst beds is initially passed through the upper catalyst bed;

(g) intermediate fluid barrier means for preventing direct fluid communication between the outlet portion of the upper catalyst bed and the inlet portion of the intermediate catalyst bed; and (h) lower fluid barrier means for preventing direct fluid communication between the outlet portion of the intermediate catalyst bed and the inlet portion of the lower catalyst bed.

2. The converter of claim 1 additionally comprising:

(a) an axial upper conduit disposed within the upper catalyst bed and an axial inner upper conduit disposed within the upper conduit and forming a conduit annulus therewith;

(b) an axial intermediate conduit disposed within the intermediate catalyst bed providing fluid communication between the inlet portion of the intermediate catalyst bed and the inlet portion of the lower catalyst bed; and (c) an axial lower conduit disposed within the lower catalyst bed providing fluid communication between the outlet portion of the intermediate catalyst bed and the outlet portion of the lower catalyst bed.

3. The converter of either claim 1 or claim 2 wherein the indirect heat exchanger is disposed above the upper catalyst bed.

4. The converter of claim 3 wherein the conduit annulus provides fluid communication between the outlet portion of the upper catalyst bed and hot heat exchange side and the inner upper conduit provides fluid communication between the hot heat exchange side and the inlet portion of the intermediate catalyst bed.

5. The converter of either claim 1 or claim 2 wherein the indirect heat exchanger is disposed below the upper catalyst bed.

6. The converter of claim 2 wherein the inner upper conduit provides fluid communication between the shell annulus and the cold heat exchange side and the conduit annulus provides fluid communication between the cold heat exchange side and the inlet portion of the upper catalyst bed.

7. The converter of claim 1 wherein volume of the intermediate catalyst bed is substantially equal to the volume of the lower catalyst bed and the volume of the upper catalyst bed is from about 35 to about 65 percent of the volume of the intermediate catalyst bed.

* * * * *